(12) United States Patent
Lee et al.

(10) Patent No.: US 10,985,412 B2
(45) Date of Patent: Apr. 20, 2021

(54) LITHIUM SECONDARY BATTERY HAVING HIGH-TEMPERATURE STORAGE PROPERTIES AND METHOD FOR MANUFACTURING THE SAME

(71) Applicant: LG Chem, Ltd., Seoul (KR)

(72) Inventors: Jung Min Lee, Daejeon (KR); Young Min Lim, Daejeon (KR); Chul Haeng Lee, Daejeon (KR); Yu Ha An, Daejeon (KR); Yi Jin Jung, Daejeon (KR); Yeon Ji Oh, Daejeon (KR)

(73) Assignee: LG Chem, Ltd.

( * ) Notice: Subject to any disclaimer, the term of this patent is extended or adjusted under 35 U.S.C. 154(b) by 81 days.

(21) Appl. No.: 16/342,067

(22) PCT Filed: Feb. 2, 2018

(86) PCT No.: PCT/KR2018/001469
§ 371 (c)(1),
(2) Date: Apr. 15, 2019

(87) PCT Pub. No.: WO2018/143733
PCT Pub. Date: Aug. 9, 2018

(65) Prior Publication Data
US 2019/0237823 A1 Aug. 1, 2019

(30) Foreign Application Priority Data
Feb. 3, 2017 (KR) .................. 10-2017-0015751
Feb. 1, 2018 (KR) .................. 10-2018-0012788

(51) Int. Cl.
*H01M 10/44* (2006.01)
*H01M 10/0525* (2010.01)
*H01M 10/04* (2006.01)
*H01M 10/0567* (2010.01)
*H01M 10/052* (2010.01)
*H01M 10/42* (2006.01)

(52) U.S. Cl.
CPC .......... *H01M 10/44* (2013.01); *H01M 10/04* (2013.01); *H01M 10/049* (2013.01); *H01M 10/052* (2013.01); *H01M 10/0525* (2013.01); *H01M 10/0567* (2013.01); *H01M 10/42* (2013.01); *H01M 2220/20* (2013.01); *Y02E 60/10* (2013.01); *Y02T 10/70* (2013.01)

(58) Field of Classification Search
CPC ............. H01M 10/44; H01M 10/052; H01M 10/0567; H01M 4/625; H01M 10/04; H01M 10/049; H01M 10/0525; H01M 10/42; H01M 2220/20
See application file for complete search history.

(56) References Cited

U.S. PATENT DOCUMENTS

| | | | |
|---|---|---|---|
| 10,276,894 B2 | 4/2019 | Lee et al. | |
| 2003/0008213 A1 | 1/2003 | Cho | |
| 2009/0087748 A1 | 4/2009 | Choi et al. | |
| 2010/0062344 A1 | 3/2010 | Koh et al. | |
| 2013/0295439 A1* | 11/2013 | Masarapu | H01M 4/38 429/163 |
| 2014/0193708 A1 | 7/2014 | Han et al. | |
| 2015/0238937 A1* | 8/2015 | Kang | C23C 16/26 428/403 |
| 2015/0273441 A1 | 10/2015 | Kim et al. | |
| 2016/0268648 A1* | 9/2016 | Ueno | H01M 10/0525 |
| 2016/0329600 A1 | 11/2016 | Lee et al. | |
| 2016/0336595 A1 | 11/2016 | Choi et al. | |
| 2018/0083316 A1 | 3/2018 | Shi et al. | |

FOREIGN PATENT DOCUMENTS

| | | | |
|---|---|---|---|
| EP | 3076472 A1 | 10/2016 | |
| KR | 20020089649 A | 11/2002 | |
| KR | 20060108110 A | 10/2006 | |
| KR | 20090034121 A | 4/2009 | |
| KR | 20120101971 A | 9/2012 | |
| KR | 20130134242 A | * 12/2013 | |
| KR | 20130134242 A | 12/2013 | |
| KR | 20140008264 A | 1/2014 | |
| KR | 20140089244 A | 7/2014 | |

(Continued)

OTHER PUBLICATIONS

Search Report from International Application No. PCT/KR2018/001469 dated May 11, 2018, 2 pages.

(Continued)

*Primary Examiner* — Adam A Arciero
(74) *Attorney, Agent, or Firm* — Lerner, David, Littenberg, Krumholz & Mentlik, LLP

(57) ABSTRACT

A method for manufacturing a lithium secondary battery including the steps of manufacturing a lithium secondary battery including an electrode assembly, a non-aqueous electrolyte in which the electrode assembly is impregnated, and a battery case receiving the non-aqueous electrolyte; performing formation of the lithium secondary battery; and performing a degassing process for removing gas generated inside the lithium secondary battery, wherein the non-aqueous electrolyte includes a lithium salt, an organic solvent and 1,2,3-trifluorobenzene as an additive, wherein the 1,2,3-trifluorobenzene is included in an amount of 0.1 wt % to 10 wt % based on the total weight of the non-aqueous electrolyte, and the formation step is performed by charging the state of charge (SOC) of the battery up to 10% to 80%, while applying a voltage of 3.5 V to 4.5 V under a pressure of 0.5 kgf/cm² to 5 kgf/cm² at 45° C. to 80° C.

11 Claims, No Drawings

(56) References Cited

FOREIGN PATENT DOCUMENTS

| | | |
|---|---|---|
| KR | 20150037601 A | 4/2015 |
| KR | 20150090862 A | 8/2015 |
| KR | 20150110318 A | 10/2015 |
| KR | 20160006414 A | 1/2016 |
| WO | 2017004820 A1 | 1/2017 |
| WO | WO-2017004820 A1 * | 1/2017 ........ H01M 10/0525 |

OTHER PUBLICATIONS

Extended European Search Report including Written Opinion for Application No. EP18747766.6 dated Jul. 31, 2019.

* cited by examiner

LITHIUM SECONDARY BATTERY HAVING HIGH-TEMPERATURE STORAGE PROPERTIES AND METHOD FOR MANUFACTURING THE SAME

CROSS-REFERENCE TO RELATED APPLICATIONS

This application is a national phase entry under 35 U.S.C. § 371 of International Application No. PCT/KR2018/001469, filed Feb. 2, 2018, which claims priority to Korean Patent Application No. 10-2017-0015751, filed Feb. 3, 2017, and Korean Patent Application No. 10-2018-0012788, filed Feb. 1, 2018, the disclosures of which are incorporated herein by reference.

TECHNICAL FIELD

The present invention relates to a method for manufacturing a lithium secondary battery of which high-temperature storage properties are improved.

BACKGROUND ART

As technical development and demand for mobile devices are increased, the demand for secondary batteries as energy sources is rapidly increasing. Among such secondary batteries, a lithium secondary battery having high energy density and voltage is being commercialized and widely used.

The lithium secondary battery is generally manufactured by a method in which a positive electrode and a negative electrode are manufactured by applying a positive electrode active material composed of a lithium-containing oxide or the like or a carbonaceous negative electrode active material capable of intercalating or deintercalating lithium ions, and a material of mixing a binder and a conductive material selectively to a positive electrode current collector and a negative electrode current collector, respectively, the positive and negative electrodes are laminated on both sides of a separator to form an electrode current collector having a predetermined shape, and then a non-aqueous electrolyte, in which an appropriate amount of a lithium salt is dissolved in this electrode current collector and an organic solvent, is inserted into a battery case and sealed. Furthermore, it is required to undergo formation and aging processes almost necessarily in order to secure the performance of the battery.

The formation process activates the battery by repeating charging and discharging after assembling the battery, and the lithium ions discharging from a lithium metal oxide, which is used as a positive electrode upon charging, are inserted by moving to a carbon electrode, which is used as a negative electrode. In this case, lithium has a strong reactivity, so that a compound such as $Li_2CO_3$, $Li_2O$, or LiOH is generated by reacting with an electrolyte on the surface of the negative electrode, and this compound forms a solid electrolyte interface (SEI) film on the surface of the negative electrode. Further, the aging process is a process for stabilizing by allowing the activated battery to stand left for a certain period as described above.

Since the lithium secondary battery completed by such a manufacturing process may accelerate the decomposition reaction of the electrolyte at a high temperature or decrease the charge/discharge capacity of the lithium secondary battery, it has been generally prohibited to be exposed to a high temperature.

However, in order to manufacture a lithium secondary battery having high energy density, secondary batteries are required to drive at a high temperature and a high voltage, and in this case, an oxide reaction between the electrolyte and the positive electrode may cause the occurrence of gas to increase during high-temperature storage and life characteristics to deteriorate.

In order to solve such a problem, there is need for a method for manufacturing a lithium secondary battery capable of decreasing the occurrence of gas during high-temperature storage and at the same time, preventing life characteristics from being lowered.

PRIOR ART DOCUMENT

Patent Document

Korean Patent Laid-Open Publication No. 2014-0008264

DISCLOSURE OF THE INVENTION

Technical Problem

An aspect of the present invention provides a method for manufacturing a lithium secondary battery capable of improving high-temperature storage safety and cycle life characteristics.

Technical Solution

According to an aspect of the present invention, there is provided a method for manufacturing a lithium secondary battery, the method including: manufacturing a lithium secondary battery, the lithium secondary battery including: an electrode assembly including a positive electrode including a positive electrode active material and a conductive material, a negative electrode including a negative electrode active material, and a separator interposed between the positive electrode and the negative electrode; a non-aqueous electrolyte in which the electrode assembly is impregnated; and a battery case receiving the electrode assembly and the non-aqueous electrolyte; performing formation of the lithium secondary battery; and performing a degassing process for removing gas generated inside the lithium secondary battery, wherein the non-aqueous electrolyte includes a lithium salt, an organic solvent, and 1,2,3-trifluorobenzene as an additive, wherein the 1,2,3-trifluorobenzene is included in an amount of 0.1 wt % to 10 wt %, based on the total weight of the non-aqueous electrolyte, and wherein the performing formation of the lithium secondary battery is performed by charging the state of charge (SOC) of the battery up to 10% to 80%, while applying a voltage of 3.5 V to 4.5 V under a pressure of 0.5 $kgf/cm^2$ to 5 $kgf/cm^2$ at 45° C. to 80° C.

In this case, the 1,2,3-trifluorobenzene may be included in an amount of 1 wt % to 10 wt %, based on the total weight of the non-aqueous electrolyte.

Advantageous Effects

The method for manufacturing a lithium secondary battery according to the present invention uses a non-aqueous electrolyte including 1,2,3-trifluorobenzene as an additive, so that the oxidation side reaction between a positive electrode and a negative electrode with an electrolyte may be suppressed through stabilization of the surfaces of the positive electrode and the negative electrode, thereby reducing the occurrence of gas. Further, due to this, a formation process may be performed at a temperature of about 45° C.

or more in the production of the lithium secondary battery, so that the wetting effect of the separator may be increased. Therefore, high-temperature storage safety and cycle life characteristics of the lithium secondary battery may be improved.

BEST MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, when the battery stands left at a high temperature in high SOC (a charging state) in order to achieve high energy density, there are disadvantages in that the occurrence of gas increases during high-temperature storage due to the increase in oxidation reaction between the electrolyte with the positive electrode, and the service life is deteriorated. Particularly, when the carbon nanotubes are applied to the positive electrode as a conductive material, the reactivity of the positive electrode and the electrolyte is increased, and the occurrence of gas is increased. Therefore, when the formation process is performed at a high temperature, the deformation (e.g. battery swelling) of the secondary battery is caused and there is a risk of explosion.

Accordingly, in an embodiment of the present invention, when a positive electrode and a negative electrode applying carbon nanotubes as a conductive material are used, the oxidation side reaction between the positive electrode and the electrolyte is restricted by stabilizing the surfaces of the positive electrode and the negative electrode, thereby reducing the occurrence of gas. Accordingly, there is provided a method for manufacturing a lithium secondary battery capable of improving the wetting effect of the separator by performing a formation process at a high temperature, and a lithium secondary battery in which high-temperature storage properties and cycle life characteristics are improved by being manufactured by such a method.

Specifically, in an embodiment of the present invention, there is provided a method for manufacturing a lithium secondary battery, the method including: manufacturing a lithium secondary battery, the lithium secondary battery including: an electrode assembly including a positive electrode including a positive electrode active material and a conductive material, a negative electrode including a negative electrode active material, and a separator interposed between the positive electrode and the negative electrode; a non-aqueous electrolyte in which the electrode assembly is impregnated; and a battery case receiving the electrode assembly and the non-aqueous electrolyte; performing formation of the lithium secondary battery; and performing a degassing process for removing gas generated inside the lithium secondary battery, wherein the non-aqueous electrolyte includes a lithium salt, an organic solvent, and 1,2,3-trifluorobenzene as an additive, wherein the 1,2,3-trifluorobenzene is included in an amount of 0.1 wt % to 10 wt %, based on the total weight of the non-aqueous electrolyte, and wherein the performing formation of the lithium secondary battery is performed by charging the state of charge (SOC) of the battery up to 10% to 80%, while applying a voltage of 3.5 V to 4.5 V under a pressure of 0.5 kgf/cm$^2$ to 5 kgf/cm$^2$ at 45° C. to 80° C.

At first, in the method of the present invention, the lithium secondary battery may be manufactured by drying and rolling after coating a positive electrode active material slurry composition including a positive electrode active material, a conductive material, a solvent, selectively a binder or the like on the positive electrode current collector.

In this case, the positive electrode current collector is not particularly limited as long as having conductivity without causing any chemical changes. For example, stainless steel, aluminum, nickel, titanium, sintered carbon, a material surface-treated with carbon, nickel, titanium, silver, etc. on the surface of aluminum or stainless steel, or the like may be used.

In addition, the positive electrode active material is a compound capable of reversibly intercalating and deintercalating lithium, and may specifically include a lithium composite metal oxide including lithium and at least one metal such as cobalt, manganese, nickel, or aluminum. More specifically, the lithium composite metal oxide may include lithium-manganese-based oxides (for example, $LiMnO_2$, $LiMn_2O_4$ or the like), lithium-cobalt-based oxides (for example, $LiCoO_2$ or the like), lithium-nickel-based oxides (for example, $LiNiO_2$ or the like), lithium-nickel-manganese-based oxides (for example, $LiNi_{1-Y}Mn_YO_2$ (where 0<Y<1), $LiMn_{2-z1}Ni_{z1}O_4$ (where 0<Z1<2 or the like), lithium-nickel-cobalt-based oxides (for example, $LiNi_{1-Y1}Co_{Y1}O_2$ (where 0<Y1<1 or the like), lithium-manganese-cobalt-based oxides (for example, $LiCo_{1-Y2}Mn_{Y2}O_2$ (where 0<Y2<1), $LiMn_{2-z2}Co_{z2}O_4$ (where 0<Z2<2) or the like), lithium-nickel-manganese-cobalt-based oxides (for example, $Li(Ni_pCo_qMn_{r1})O_2$ (where 0<p<1, 0<q<1, 0<r1<1, p+q+r1=1) or $Li(Ni_{p1}Co_{q1}Mn_{r2})O_4$ (where 0<p1<2, 0<q1<2, 0<r2<2, p1+q1+r2=2) or the like), lithium-nickel-cobalt-transition metal (M) oxides (for example, $Li(Ni_{p2}Co_{q2}Mn_{r3}M_{s2})O_2$ (where M is selected from the group consisting of Al, Fe, V, Cr, Ti, Ta, Mg and Mo, and p2, q2, r3 and s2 are an atomic fracture of independent elements, which are 0<p2<1, 0<q2<1, 0<r3<1, 0<s2<1, p2+q2+r3+s2=1, respectively), or the like), or the like, and any one or two or more compounds thereof may be included. Among these, from the viewpoint that the capacity characteristics and stability of the battery may be improved, the lithium metal oxide may include $LiCoO_2$, $LiMnO_2$, $LiNiO_2$, lithium-manganese-cobalt oxides (for example, $Li(Ni_{0.6}Mn_{0.2}Co_{0.2})O_2$, $Li(Ni_{0.5}Mn_{0.3}Co_{0.2})O_2$, (Li$(Ni_{0.8}Mn_{0.1}Co_{0.1})O_2$, or the like), or lithium-nickel-cobalt-aluminum oxides (for example, $Li(Ni_{0.8}Co_{0.15}Al_{0.05})O_2$ or the like), or the like. Considering the remarkable improvement effect according to controlling the kind and content ratio of the constituent elements forming the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, and any one or two or more mixtures thereof may be used.

The positive electrode active material may be included in an amount of 80 wt % to 99 wt %, based on the total weight of the positive electrode active material slurry composition.

In addition, the positive electrode may include carbon nanotubes as a conductive material.

Since carbon nanotubes have high reactivity among the conductive materials, the conductivity may be highly improved even when used in a smaller amount than in the case of using other conductive materials. However, when the carbon nanotubes are used as a conductive material, there is a problem that a large amount of gas may be generated during the formation process of the lithium secondary battery, so that the use thereof is limited.

In the present invention, 1,2,3-trifluorobenzene is used in the non-aqueous electrolyte and the generation of gas in the battery may be restricted even when the carbon nanotubes are used, thereby controlling the swelling phenomenon or the like caused by the generation of gas. Therefore, the safety of the lithium secondary battery may be improved even in a high-temperature and high-pressure process.

The carbon nanotube is a secondary structure formed by collecting a plurality of carbon nanotube unit bodies, and may have a bundle type in the form of a bundle or a rope in which the plurality of carbon nanotubes is arranged in parallel substantially to the same orientation with the axis of the longitudinal direction of the unit body, or may have an entangled shape in which the carbon nanotube unit bodies are entangled. Among them, the carbon nanotubes may be a bundle type considering excellent dispersion.

Generally, the carbon nanotubes may have different physical properties depending on the crystallinity, structure and form of the constituent unit body, the structure and form of secondary particles constituting the unit body, and the amount of metal elements contained in the carbon nanotubes. Accordingly, any one or two or more of the above factors may be controlled in combination, thereby obtaining desired physical properties depending on the use of the carbon nanotubes. Specifically, the carbon nanotubes have high crystallinity during growth, and the smaller the defect, the thinner the thickness of the wall forming the carbon nanotubes, the lower the resistance may be. Further, the lower the resistance of the carbon nanotubes themselves, the lower the resistance in the electrode may become when applied to the electrode production. As a result, the battery performance may be improved.

The carbon nanotubes used in the present invention may include any one or two or more of single wall, double wall, and multiwall carbon nanotube unit bodies.

In addition, the carbon nanotubes may have a diameter of the unit body of 10 nm to 100 nm, and a length thereof of 3 μm to 10 3 μm. When the carbon nanotube unit body satisfies the diameter and length conditions, the formation of the electrically conductive network may be facilitated without fear of non-uniform dispersion in the positive electrode material mixture.

In addition, the carbon nanotubes may have a specific surface area of 20 m$^2$/g to 2000 m$^2$/g as secondary particles, together with the diameter and length conditions of the unit body. When the specific surface area of the carbon nanotubes is less than 20 m$^2$/g, the improvement effect may be insignificant due to decrease of the reaction area, and when the specific surface area exceeds 2000 m$^2$/g, the formation of the conductive network may be difficult. More specifically, considering the remarkable improvement effect due to the specific surface area control of the carbon nanotubes, the specific surface area of the carbon nanotubes may be 100 m$^2$/g to 400 m$^2$/g.

In the present invention, the specific surface area of the carbon nanotubes is measured by the BET method, and may be specifically calculated from the adsorption amount of nitrogen gas at a temperature (77K) of liquid nitrogen by using BEL Japan Company BELSORP-mino II.

The carbon nanotubes may have a bulk density of 0.01 kg/m$^3$ to 200 kg/m$^3$, more specifically 0.01 kg/m$^3$ to 10 kg/m$^3$, further more specifically 0.01 kg/m$^3$ to 1 kg/m$^3$. The lower the carbon nanotubes becomes, the better the dispersibility exhibits. However, when the bulk density is excessively low, the amount of the carbon nanotube unit body in the electrode is reduced and the electrical conductivity in the electrode may be lowered. The carbon nanotubes used in the present invention may have the bulk density of the above-described range, thereby exhibiting excellent electrical conductivity. In the present invention, the bulk density of the carbon nanotubes may be determined according to Equation 1 below.

Bulk density (kg/m$^3$)=weight of carbon nanotube (kg)/volume of carbon nanotube (m$^3$)　　　[Equation 1]

In the method of the present invention, the carbon nanotubes used as a conductive material for the positive electrode may be used by commercially obtaining or may be used by directly producing. When produced, the carbon nanotubes may be produced by using an arc discharging method, a laser vaporization method, a chemical vaporization deposition method or the like, and the physical properties may be realized through control of the kind of catalyst, a heat treatment temperature, an impurity removal method and the like in the production process.

The carbon nanotubes may be included in an amount of 2 parts by weight or less, based on 100 parts by weight of the positive electrode active material. Specifically, the carbon nanotubes may be included in an amount of 0.1 to 2 parts by weight, specifically, 0.3 to 1 part by weight, based on 100 parts by weight of the positive electrode active material. When the amount of the carbon nanotubes is within the above range, the carbon nanotubes may be uniformly dispersed even while maintaining the conductivity in the positive electrode in a certain level or more, so that pores in the electrode are clogged to prevent the Li transfer resistance in the electrolyte from being increased, and thus the output characteristics may be improved.

In addition, the binder is a constituent which assists in bonding between the active material, the conductive material and the like, and in bonding to the current collector, and is generally added in an amount of 1 to 20 wt % based on the total weight of the positive electrode active material slurry composition. Examples of such a binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, or the like.

The solvent may include an organic solvent such as N-methyl-2-pyrrolidone (NMP). When the positive electrode active material, selectively the binder and the conductive material, and the like are included, the solvent may be used in an amount to become a desirable viscosity. For example, the solid content including the positive electrode active material, selectively the binder and the conductive material and the like may be included in a concentration of 40 wt % to 95 wt %, preferably 40 wt % to 90 wt %.

Subsequently, in the method of the present invention, the negative electrode active material slurry composition including the negative electrode active material, the conductive material, the solvent, selectively the binder and the like is coated on the negative electrode current collector, and then is dried and rolled, so that a negative electrode may be manufactured.

The negative electrode current collector is generally made to have a thickness of 3 μm to 500 μm. Such a negative electrode current collector is not particularly limited as long as having high conductivity without causing chemical changes in the battery. For example, aluminum, copper, stainless steel, nickel, titanium, sintered carbon, a material surface-treated with carbon, nickel, titanium, silver or the like on the surface of copper or stainless steel, an aluminum-cadmium alloy or the like may be used. Further, like the positive electrode active material, the negative electrode current collector may form fine unevenness on the surface to enhance the bonding force of the negative electrode active material, and may be used in various forms such as films, sheets, foils, nets, porous bodies, foams and nonwoven fabrics.

The negative electrode active material may include carbonaceous materials such as natural graphite and artificial graphite; a metal composite oxide such as $Li_{x1}Fe_2O_3$ ($0 \le x1 \le 1$), $Li_{x2}WO_2$ ($0 \le x2 \le 1$), and $Sn_{x3}Me_{1-x3}Me'_{y1}O_z$ (Me: Mn, Fe, Pb, Ge; Me': Al, B, P, Si, groups 1, 2, and 3 of the periodic table, halogen; $0<x3=1$; $1 \le y1 \le 3$; $1 \le z \le 8$); a lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; a conductive polymer such as polyacetylene; a Li—Co—Ni-based material; a lithium titanium oxide (LTO), and the like.

The negative electrode active material may be included in an amount of 80 wt % to 99 wt %, based on the total weight of the negative electrode active material slurry composition.

The conductive material is a constituent for further improving the conductivity of the negative electrode active material, and may be added in an amount of 1 to 20 wt % based on the total weight of the negative electrode active material slurry composition. Such a conductive material is not particularly limited as long as having conductivity without causing chemical changes in the battery. Examples of the conductive material may include the carbon nanotubes as described above; graphite such as natural graphite or artificial graphite; carbon black such as acetylene black, ketjen black, channel black, furnace black, lamp black, or thermal black; conductive fibers such as carbon fiber and metal fiber; metal powders such as carbon fluoride, aluminum and nickel powder; conductive whiskey such as zinc oxide and potassium titanate; conductive metal oxides such as titanium oxide; conductive materials such as polyphenylene derivatives, and the like.

The binder is a constituent which assists in bonding between the conductive material, the active material, and the current collector, and is generally included in an amount of 1 to 20 wt % based on the total weight of the negative electrode active material slurry composition. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluorine rubber, various copolymers thereof, or the like.

The solvent may include an organic solvent such as water (distilled water) or N-methyl-2-pyrrolidone (NMP). When the negative electrode active material, selectively the binder and the conductive material and the like are included, the solvent may be used in an amount to achieve a desirable viscosity. For example, the solid content including the negative electrode active material, and selectively the binder and the conductive material may be included in a concentration of 40 wt % to 95 wt %, preferably 40 wt % to 90 wt % to achieve a desired viscosity.

Next, in the method of the present invention, a separator was interposed between the manufactured positive electrode and negative electrode to fabricate an electrode assembly.

As for the separator, a typical porous polymer film used as a conventional separator, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer may be used alone or in a laminated form thereof, or a typical porous nonwoven fabric, for example, a nonwoven fabric made of a glass fiber having a high melting point, polyethylene terephthalate fiber or the like may be used, but is not limited thereto.

Subsequently, the method for manufacturing a lithium secondary battery of the present invention may include the steps of receiving the electrode assembly to a battery case and injecting the non-aqueous electrolyte.

The battery case is used as an exterior material for packing the battery and is not particularly limited to the appearance thereof. However, the battery may have a cylindrical shape, a square shape, a pouch shape, a coin shape or the like, which uses a can, and may specifically include a pouch shape.

In addition, in the method for manufacturing a lithium secondary battery of the present invention, the non-aqueous electrolyte may include a lithium salt, an organic solvent and 1,2,3-trifluorobenzene as an additive.

The lithium salt may be used without particular limitation as long as being a compound being capable of providing lithium ions used in the lithium secondary battery. Specifically, the lithium salt includes Li+ as a cation, and as an anion, may include at least one selected from the group consist of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$. The lithium salt may be used alone or in combination of two kinds or more as necessary.

The lithium salt may be used alone or in combination of two kinds or more as necessary. The lithium salt may be appropriately changed within a generally usable range, but the lithium salt may be included in a concentration of 1 M to 1.5 M in the electrolyte in order to obtain an optimum effect of forming a corrosion-resistant film on an electrode surface.

In addition, the organic solvent may be used without any particular limitation as long as being capable of acting as a media through which ions involved in an electrochemical reaction of a battery may move. Specifically, as the organic solvent, for example, a linear carbonate compound, a cyclic carbonate compound, an ether compound, an ester compound, or the like may be each used alone or in combination of two kinds or more. Among the organic solvents, the cyclic carbonate compound, the linear carbonate compound, or a mixture thereof may be typically included.

Specific examples of the cyclic carbonate compound include any one selected from the group consisting of ethylene carbonate (EC), propylene carbonate (PC), 1,2 butylene carbonate, 2,3-butylene carbonate, 1,2-pentylene carbonate, 2,3-pentylene carbonate, vinylene carbonate and fluoroethylene carbonate (FEC), or a mixture of two or more thereof. As specific examples of the linear carbonate compound, any one selected from the group consisting of dimethyl carbonate (DMC), diethyl carbonate (DEC), dipropyl carbonate, methyl ethyl carbonate (MEC), ethyl methyl carbonate (EMC), methyl propyl carbonate, ethyl propyl carbonate and the like, or a mixture of two or more thereof may be typically used, but is not limited thereto.

As the ether compound, any one selected from the group consisting of dimethyl ether, diethyl ether, dipropyl ether, methylethyl ether, and methylporpyl ether, or a mixture of two or more thereof may be used, but is not limited thereto.

The ester compound may use, but is not limited to, a linear ester selected from the group consisting of methyl propionate, ethyl propionate (EP), propyl propionate (PP), n-propyl propionate, iso-propyl propionate, n-butyl propionate, iso-butyl propionate and tert-butyl propionate; and any one selected from the group consisting of cyclic esters such as γ-butyrolactone, γ-valerolactone, γ-caprolactone, σ-valerolactone and ε-prolactone, or a mixture of two or more thereof.

Among them, as the organic solvent having a high viscosity among the carbonate-based organic solvents, a cyclic carbonate such as ethylene carbonate and propylene carbonate, which are known to dissociate lithium salts well in the electrolyte due to a high dielectric constant thereof, may be used. In addition to such a cyclic carbonate, when the linear carbonate having a low viscosity and a low dielectric constant is used by mixing at an appropriate ratio, an electrolyte having high electric conductivity may be prepared. Particularly, it is more preferable to use a mixture of the carbonate-based solvent with the propionate-based solvent having a high ionic conductivity and a high dielectric constant capable of increasing the charge/discharge performance of the battery.

In addition, the 1,2,3-trifluorobenzene represented by Formula 1 below included as the non-aqueous electrolyte additive may be included in an amount of 0.1 wt % to 10 wt %, specifically 1 wt % to 10 wt %, based on the total weight of the non-aqueous electrolyte.

[Formula 1]

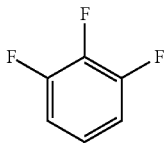

The 1,2,3-trifluorobenzene is included in the above-described range in the non-aqueous electrolyte, thereby being adsorbed on the surface of the positive electrode and forming a film, so that the positive electrode is stabilized and the resistance is suppressed form increasing. In particular, when using the positive electrode including carbon nanotubes as a conductive material in a lithium metal oxide, for example, $LiCoO_2$, or a lithium nickel manganese cobalt oxide, the safety of the cell may be further improved in a high voltage area of 4.4 V or more. In addition, transition metals are suppressed from being eluted on the surface of the positive electrode and the eluted metal is prevented from being electrodeposited on the surface of the negative electrode to which the artificial graphite is applied, thus being capable of realizing an additional effect that a stable SEI film is formed on the surface of the negative electrode. Therefore, when the lithium secondary battery is charged at a high voltage and a high temperature, a side reaction of the electrolyte with the positive electrode or the negative electrode may be suppressed, and thus reducing decomposition of the electrolyte or generation of gases such as $CO$, $CO_2$, $CH_4$, and $C_2H_6$ due to the side reaction, so that the effect of suppressing swelling and improving life characteristics may be brought.

Particularly, in present invention, by providing the electrolyte containing 1,2,3-trifluorobenzene, a stable SEI film may be formed on the surface of the negative electrode by a reaction which forms a hard film such as LiF on the surface of the negative electrode. Therefore, the formation process may be performed at a temperature of 45° C. or more and under a pressurization condition in the production of the secondary battery, so that an initial wettability effect with respect to a separator may be improved to realize a uniform charging state. As a result, a secondary battery in which high-temperature storage properties and cycle life characteristics are improved may be manufactured.

In this case, when the amount of the 1,2,3-trifluorobenzene is within the above range, high-temperature storage stability and cycle characteristics of the battery may be improved, and it is possible to control occurrence of a side reaction in the electrolyte even when charging/discharging the battery.

In addition, in the method for manufacturing a lithium secondary battery of the present invention, in addition to 1,2,3-trifluorobenzene as an additive, in order to improve the life characteristics of the battery, suppress the decrease of the battery capacity, and improve the discharge capacity of the battery, the non-aqueous electrolyte may further include at least one additive such as a haloalkylene carbonate compound such as 1,3-propane sultone (PS), vinylene carbonate (VC), succinonitrile (SN), fluoroethylene carbonate (FEC) or difluoroethylene carbonate, lithium difluoro (oxalato) borate (LiODFB), pyridine, triethylphosphite, triethanolamine, cyclic ether, ethylene diamine, n-glyme, hexaphosphate triamide, nitrobenzene derivatives, sulfur, quinone imine dyes, N-substituted oxazolidinones, N,N-substituted imidazolidine, ethylene glycol dialkyl ether, ammonium salt, pyrrole, 2-methoxyethanol, or aluminum trichloride. In this case, the additive which may be added in addition to 1,2,3-trifluorobenzene may be included in an amount of 0.1 wt % to 10 wt % based on the total weight of the electrolyte. On the other hand, in order to stably form an SEI film in addition to the 1,2,3-trifluorobenzene, vinylene carbonate, ethylene sulfate, 1,3-propane sultone or the like may be further included.

In addition, in the method for manufacturing a lithium secondary battery of the present invention, a step of sealing after injecting a non-aqueous electrolyte into the battery case may be further included.

The sealing step may be performed by thermally welding or thermally fusing the opened part of the battery case.

In addition, after the non-aqueous electrolyte is injected and sealed, the method for manufacturing a lithium secondary battery of the present invention may further perform, in some cases, a process of primary aging the lithium secondary battery may be further performed at room temperature and atmospheric pressure such that the non-aqueous electrolyte may be impregnated well into the electrode assembly. The specific temperature range of room temperature conditions may be 20° C. to 35° C., preferably 25° C. to 35° C., more preferably 25° C. to 30° C.

In addition, the pressure range of specific atmospheric pressure conditions may be 1 atm to 1.5 atom, more preferably 1 atm to 1.3 atm.

The primary aging process may perform by storing the lithium secondary battery into which the non-aqueous electrolyte is injected for 0.5 to 72 hours, preferably for 12 to 72 hours, more preferably for 24 to 72 hours. When the primary aging process is performed under the above room temperature and atmospheric pressure conditions for the above time range, the wettability of the non-aqueous electrolyte with respect to the electrode and the separator in the battery is improved, a sufficient capacity may be exhibited, and a side reaction such as lithium precipitation may be minimized during the operation of the battery.

In addition, in the method for manufacturing a lithium secondary battery of the present invention, the non-aqueous electrolyte is injected into the battery case, and then the battery is charged or charged/discharged, thus being capable of performing a formation process which is an initial activation process.

The formation process is an initial charging step in which a charge/discharge is partially performed in order to activate the battery and thus an SEI film is formed on the surface of the negative electrode.

That is, in the formation step, lithium ions discharged from the lithium transition metal oxide used as a positive electrode active material move to and inserted into the carbon electrode used as a negative electrode. In this case, the lithium ions have strong reactivity and thus react with a carbonaceous material negative electrode to form a compound such as $Li_2CO_3$, LiO, or LiOH. The lithium ions form a solid electrolyte interface, that is, an SEI film on the surface of the negative electrode.

The formation step is preferably performed such that the state of charge (SOC) of the battery is charged to 10% to 80%, specifically 20% to 70%. When the state of charge (SOC) of the battery is within the above range, the reducibility of the 1,2,3-trifluorobenzene is maintained in a certain level or higher, thereby being capable of suppressing the occurrence of the swelling phenomenon during the formation step and lowering the initial resistance. Further, the SEI film may be uniformly formed by minimizing a side reaction during the formation step.

In the formation step, by inducing gas generation in advance by the electrode reaction, the swelling phenomenon of the battery may be prevented from occurring, resulting from the additional generation of the excessive gas when charging/discharging later. As a result, the high-temperature storage properties and high-temperature cycle characteristics of the secondary battery may be ultimately improved.

In the method for manufacturing a lithium secondary battery of the present invention, the formation process may be performed in a temperature range of 45° C. or higher, specifically 45° C. to 80° C., preferably 50° C. to 80° C., more preferably 60° C. to 80° C.

Generally, when the formation process is performed at a temperature lower than 45° C., the wetting effect of the separator of the secondary battery is reduced, so that the effect of improving high-temperature storage properties and cycle life characteristics may be insignificant. When the formation process is performed at a temperature of higher than 80° C., gas generation may be increased by vaporization of 1,2,3-trifluorobenzene.

In addition, the formation step may be performed at a pressure of 0.5 kgf/cm² to 5 kgf/cm², specifically 1 kgf/cm² to 5 kgf/cm², more specifically 2 kgf/cm² to 5 kgf/cm². In this case, when the formation step is performed at a pressure within the above range, gas generated at a high temperature is sufficiently removed, and thus may minimize non-uniformity of the surface of the electrode resulting from gas generation and previously preventing the phenomenon in which the electrolyte remained inside the battery is excessively discharged due to high voltage.

On the other hand, the formation step may be performed by applying a voltage of 3.5 V to 4.5 V, more preferably 3.5 V to 4.4 V. In this case, when a voltage is applied within the above range, the SEI film may be stably formed at the beginning of the formation step, and the structure of the positive electrode active material may be stably maintained in the positive electrode, so that battery degradation may be prevented from occurring.

In addition, in the method for manufacturing a lithium secondary battery of the present invention, after the formation process, a secondary aging process of storing or standing left the lithium secondary battery may be further performed as necessary.

The secondary aging process is preferably performed at room temperature and atmospheric pressure conditions. The temperature range of specific room temperature conditions may be 20° C. to 35° C., preferably 25° C. to 35° C., more preferably 25° C. to 30° C.

In addition, the pressure range of specific atmospheric pressure conditions may be 1 atm to 1.5 atm, more preferably 1 atm to 1.3 atm.

The secondary aging process may be performed by storing the lithium secondary battery in which the formation process has been undergone for 12 hours to 48 hours, more preferably 24 hours to 48 hours. When the secondary aging process is performed under the above room temperature and atmospheric pressure conditions for the above time range, the wettability of the non-aqueous electrolyte with respect to the electrode and the separator in the battery may be improved, so that a sufficient capacity may be exhibited and a side reaction may be minimized.

In addition, the method for manufacturing a lithium secondary battery of the present invention may carry out a degassing process of removing gas after the secondary aging process. The degassing process is a step of removing gas, which is particularly generated inside the battery by an initial charging or aging process. In the degassing process, the sealing of the battery case is opened, or separate degassing mechanism is provided, and thus may previously removes not only gas such as carbon dioxide and methane, which are generated when a SEI film is formed in the formation step, but also gas or the like having the above-described constituents, which are generated in a high-temperature aging step and cause the swelling phenomenon of the battery later. After the removal of the gas, a step of resealing the unsealed part or opened part of the battery case due to the degassing step may be included.

In addition, in one embodiment of the present invention, a lithium secondary battery manufactured by the method of the present invention may be provided.

The lithium secondary battery provides a positive electrode including a positive electrode active material and a conductive material; a negative electrode including a negative electrode active material; an electrode assembly including a separator interposed between the positive electrode and the negative electrode; a non-aqueous electrolyte impregnating the electrode assembly; and a battery case receiving the electrode assembly and the non-aqueous electrolyte. The positive electrode may include carbon nanotubes as a conductive material, and the non-aqueous electrolyte may include a lithium salt, an organic solvent, and 1,2,3-trifluorobenzene as an additive.

In this case, the lithium secondary battery may include a lithium metal secondary battery, a lithium ion secondary battery, a lithium polymer secondary battery, a lithium ion polymer secondary battery, or the like.

Such a lithium secondary battery of the present invention is manufactured by the method for manufacturing a lithium secondary battery of the present invention which performs a formation process at a temperature of 45° C. to 80° C. while using the non-aqueous electrolyte including 1,2,3-trifluorobenzene as an additive, so that the effect of improving high-temperature storage properties and cycle life characteristics may be realized.

The lithium secondary battery according to the present invention exhibits high energy density, high output characteristics, and improved safety and stability, and thus may be preferably used in particular as a constituent battery of a medium/large-sized battery module. Therefore, the present invention also provides a medium/large-sized battery module including the above-described secondary battery as a unit cell.

Such a medium/large-sized battery module may be preferably applied to a power source requiring high output and large capacity, such as an electric vehicle, a hybrid electric vehicle, and an output storage device.

MODE FOR CARRYING OUT THE INVENTION

Hereinafter, Examples and Comparative Examples of the present invention will be described. However, the following examples illustrate preferred embodiments of the present invention, and the present invention is not limited by the following examples.

EXAMPLE

Example 1

(Preparation of Non-Aqueous Electrolyte)

A non-aqueous electrolyte was prepared by adding 5 g of 1,2,3-trifluorobenzene, 1 g of vinylene carbonate (VC) and 3 g of 1,3-propansulton to 91 g of the mixed solvent prepared by mixing 1.0 M of $LiPF_6$ with an organic solvent having a composition of carbonate (EC): propylene carbonate (PC): propyl propionate (PP)=3:1:6 (weight ratio).

(Manufacture of Positive Electrode)

A positive electrode active material slurry was prepared by adding 70 parts by weight of a solid content, which mixes a positive electrode active material (lithium cobalt oxides ($LiCoO_2$)): a conductive material (bundle-type carbon nanotubes (manufactured by LG Chem., No.: B.CNT): a binder (polyvinylidene fluoride (PVDF)) in a weight ratio of 97.7: 0.3:2, based on 100 parts by weight of N-methyl-2-pyrrolidone (NMP) as a solvent. The positive electrode active material slurry was applied to a positive electrode current collector (Al thin films) having a thickness of 20 μm, and drying and roll press were performed, so that a positive electrode was manufactured.

(Manufacture of Negative Electrode)

A negative electrode active material slurry was prepared by adding 40 parts by weight of a solid content, which mixes a negative electrode active material (artificial graphite): a conductive material (carbon black): a binder (polyvinylidene fluoride (PVDF)) in a weight ratio of 97:0.5:2.5. The negative electrode active material slurry is applied to a negative electrode current collector (Cu thin films) having a thickness of 8 μm, and drying and roll press were performed, so that a negative electrode was manufactured.

(Manufacture of Secondary Battery)

An electrode assembly was fabricated by a general method of sequentially laminating the positive electrode and the negative electrode manufactured by the above-described method with porous films, the electrode assembly was then stored in a pouch-type secondary battery case, and then a non-aqueous electrolyte was injected into the inside of the pouch-type secondary battery case and was sealed, followed by performing a primary aging step of storing and standing left for about 48 hours at 25° C. and 1 atm.

While applying a voltage of 3.5 V at 60° C. under a pressure of 1 $kgf/cm^2$, the formation process was performed by charging to 30% of the state of charge (SOC) of the battery under a condition of 1/12 C. The electrode assembly was stored and left at 25° C. under a pressure of 1 atm and a secondary aging step was performed. Thereafter, the degassing process was performed to manufacture a lithium secondary battery.

Example 2

A non-aqueous electrolyte and a lithium secondary battery including the same were produced in the same manner as in Example 1, except that 1 g of 1,2,3-trifluorobenzene was included in 95 g of the mixed solvent in the preparation of the non-aqueous electrolyte of Example 1.

Example 3

A lithium secondary battery including the same were manufactured in the same manner as in Example 1, except that the formation process was performed under a pressure condition of 5 $kgf/cm^2$ at the time of manufacturing the secondary battery of Example 1.

Example 4

A lithium secondary battery was manufactured in the same manner as in Example 1, except that the formation process was performed by applying a voltage of 4.4 V at the time of manufacturing the secondary battery of Example 1.

Example 5

A lithium secondary battery was manufactured in the same manner as in Example 1, except that the formation process was performed at a temperature of 80° C. at the time of manufacturing the secondary battery of Example 1.

Example 6

A non-aqueous electrolyte and a lithium secondary battery including the same were manufactured in the same manner as in Example 1, except that the formation process was performed by applying a voltage of 4 V at a pressure of 5 $kgf/cm^2$ at the time of manufacturing the secondary battery, and the state of charge (SOC) of the battery was charged to 80% and performed in a condition of 1/12 C.

Comparative Example 1

A non-aqueous electrolyte and a lithium secondary battery including the same were produced in the same manner as in Example 1, except that 1,2,3-trifluorobezene was not included.

Comparative Example 2

A lithium secondary battery was manufactured in the same manner as in Example 1, except that the state of charge (SOC) of the battery was charged to 5% during the formation process at the time of manufacturing the secondary battery of Example 1.

Comparative Example 3

A lithium secondary battery was manufactured in the same manner as in Example 1, except that the formation process was performed by being charged to 100% of the state of charge (SOC) of the battery at the time of manufacturing the secondary batter of Example 1.

Comparative Example 4

A lithium secondary battery was manufactured in the same manner as in Example 1, except that the formation process was performed by applying a voltage of 3.2 V at the time of manufacturing the secondary batter of Example 1.

Comparative Example 5

A lithium secondary battery was manufactured in the same manner as in Example 1, except that the formation process was performed at a temperature of 25° C. at the time of manufacturing the secondary batter of Example 1.

Comparative Example 6

A lithium secondary battery was manufactured in the same manner as in Example 1, except that the formation process was performed at a pressure of 10 kgf/cm$^2$ at the time of manufacturing the secondary batter of Example 1.

Comparative Example 7

A lithium secondary battery was manufactured in the same manner as in Example 1, except that the formation process was charged to 50% of the state of charge (SOC) of the battery while applying a voltage of 3 V at a pressure of 0.3 kgf/cm$^2$ at the time of manufacturing the secondary batter of Example 1.

Comparative Example 8

A non-aqueous electrolyte and a lithium secondary battery including the same were produced in the same manner as in Example 1, except that 76 g of 1,2,3-trifluorobenzene was included in 76 g of the mixed solvent in the preparation of the non-aqueous electrolyte of Example 1.

EXPERIMENTAL EXAMPLE

Experimental Example 1. Evaluation of Room Temperature Cycle Characteristics Each of the lithium secondary batteries manufactured in Examples 1 to 6 and Comparative Examples 1 to 8 was charged up to 4.45 V at 0.8 C under constant current/constant voltage (CC/CV) conditions at 25° C. and discharged up to 3.03 V at 0.5 C under a constant current (CC) condition, and the charge/discharge thereof was performed by being repeated from 1 to 100 cycles. A capacity retention ratio (%) was calculated from the measured discharge capacity by using Equation 2 below, and was shown in Table 1 below.

Capacity retention ratio (%)=(discharge capacity for each cycle)/(discharge cycle of the first cycle)×100  [Equation 2]

TABLE 1

|  | 100 times capacity retention ratio (%) |
|---|---|
| Example 1 | 92% |
| Example 2 | 94% |
| Example 3 | 93% |
| Example 4 | 87% |
| Example 5 | 94% |
| Example 6 | 89% |
| Comparative Example 1 | 78% |
| Comparative Example 2 | 69% |
| Comparative Example 3 | 79% |
| Comparative Example 4 | 82% |
| Comparative Example 5 | 82% |
| Comparative Example 6 | 83% |
| Comparative Example 7 | 73% |
| Comparative Example 8 | 77% |

Referring to Table 1, it may be seen that the capacity retention ratios of the lithium secondary batteries manufactured in Examples 1 to 6 are superior to those of the lithium secondary batteries manufactured in Comparative Examples 1 to 8.

Experimental Example 2. Evaluation of High-Temperature Storage Gas Generation A test was performed in the conditions that each of the lithium secondary batteries manufactured in Examples 1 to 6 and Comparative Examples 1 to 8 were charged to 4.45 V, then heated to 60° C. at a heating rate of 1° C./min, then stored for 3 weeks at 60° C., and then cooled to room temperature for 3 hours. The degree of gas generation of the battery over time (swelling of the battery) was measured, and the results were shown in Table 2 below.

TABLE 2

|  | Degree of battery swelling depending on high-temperature storage period (%) | | |
|---|---|---|---|
|  | 1 week (%) | 2 weeks (%) | 3 weeks (%) |
| Example 1 | 2% | 4% | 12% |
| Example 2 | 2% | 5% | 15% |
| Example 3 | 2% | 5% | 10% |
| Example 4 | 4% | 6% | 20% |
| Example 5 | 2% | 4% | 8% |
| Example 6 | 2% | 5% | 13% |
| Comparative Example 1 | 5% | 18% | 44% |
| Comparative Example 2 | 4% | 12% | 27% |
| Comparative Example 3 | 6% | 11% | 35% |
| Comparative Example 4 | 4% | 6% | 30% |
| Comparative Example 5 | 3% | 5% | 25% |
| Comparative Example 6 | 2% | 4% | 23% |
| Comparative Example 7 | 5% | 16% | 32% |
| Comparative Example 8 | 3% | 11% | 25% |

Referring to Table 2, it may be seen that in the case of the secondary batteries manufactured in Examples 1 to 6, the degree of gas generation (swelling of the battery) is not large even when being stored for a long time at a high temperature. Whereas, in the case of the secondary battery of Comparative Example 1 which uses an electrolyte not including 1,2,3-trifluorobenzene, an oxidation side reaction between the positive electrode and the electrolyte is caused and more gas is generated than the secondary batteries of Examples 1 to 6.

In addition, it may be seen that in the case of the lithium secondary batteries of Comparative Examples 2 to 7, in which the formation conditions are beyond the range of the present invention, the degree of gas generation is higher than that of the secondary batteries of Examples 1 to 6.

In addition, it may be seen that the secondary battery of Comparative Example 8 including an excess amount of 1,2,3-trifluorobenzene also has a higher degree of gas generation than the secondary batteries of Examples 1 to 6.

The invention claimed is:

1. A method for manufacturing a lithium secondary battery, comprising:
    manufacturing a lithium secondary battery, the lithium secondary battery including: an electrode assembly including a positive electrode including a positive electrode active material and a conductive material, a negative electrode including a negative electrode active material, and a separator interposed between the positive electrode and the negative electrode; a non-aqueous electrolyte in which the electrode assembly is impregnated; and a battery case receiving the electrode assembly and the non-aqueous electrolyte;
    performing formation of the lithium secondary battery; and
    after the performing formation, performing a degassing process for removing gas generated inside the lithium secondary battery,
    wherein the non-aqueous electrolyte includes a lithium salt, an organic solvent, and 1,2,3-trifluorobenzene as an additive, wherein the 1,2,3-trifluorobenzene is included in an amount of 0.1 wt % to 10 wt %, based on the total weight of the non-aqueous electrolyte, and
    wherein the performing of formation of the lithium secondary battery is performed by charging a state of charge (SOC) of the battery up to 10% to 80%, while applying a voltage of 3.5 V to 4.5 V under a pressure of 0.5 kgf/cm$^2$ to 5 kgf/cm$^2$ at 45° C. to 80° C.

2. The method of claim 1, wherein the 1,2,3-trifluorobenzene is included in an amount of 1 wt % to 10 wt % based on a total weight of the non-aqueous electrolyte.

3. The method of claim 1, wherein the state of charge (SOC) of the battery in the performing formation of the lithium secondary battery is performed by charging up to 20% to 70%.

4. The method of claim 1, further comprising primary aging of storing or allowing to stand the secondary battery for 0.5 hours to 72 hours before the performing formation of the lithium secondary battery.

5. The method of claim 4, wherein the primary aging is performed under a temperature condition of 20° C. to 35° C. and a pressure condition of 1 atm to 1.5 atm.

6. The method of claim 1, further comprising secondary aging of storing or allowing to stand the secondary battery for 12 hours to 48 hours after the performing formation of the lithium secondary battery and before the performing a degassing process.

7. The method of claim 6, wherein the secondary aging is performed under a temperature condition of 20° C. to 35° C. and a pressure condition of 1 atm to 1.5 atm.

8. The method of claim 1, wherein the positive electrode comprises carbon nanotubes as a conductive material.

9. The method of claim 8, wherein the carbon nanotubes have a bulk density of 0.01 kg/m$^3$ to 200 kg/m$^3$.

10. The method of claim 8, wherein the carbon nanotubes are included in an amount of 0.1 to 2 parts by weight based on 100 parts by weight of the positive electrode active material.

11. The method of claim 1, wherein an SEI film is formed on a surface of the negative electrode by the performing formation of the lithium secondary battery.

* * * * *